United States Patent
Demeyer

(10) Patent No.: US 8,290,334 B2
(45) Date of Patent: Oct. 16, 2012

(54) APPARATUS AND METHOD FOR AUTOMATED VIDEO EDITING

(75) Inventor: Michael Francis Demeyer, Dublin, CA (US)

(73) Assignee: Cyberlink Corp., Shindian, Taipei (TW)

( * ) Notice: Subject to any disclaimer, the term of this patent is extended or adjusted under 35 U.S.C. 154(b) by 1192 days.

(21) Appl. No.: 10/755,122

(22) Filed: Jan. 9, 2004

(65) Prior Publication Data

US 2005/0152666 A1  Jul. 14, 2005

(51) Int. Cl.
*H04N 5/765* (2006.01)
*H04N 5/931* (2006.01)

(52) U.S. Cl. ........................................ 386/200; 386/204

(58) Field of Classification Search ..................... 386/46, 386/52
See application file for complete search history.

(56) References Cited

U.S. PATENT DOCUMENTS

| | | | |
|---|---|---|---|
| 6,016,380 A | 1/2000 | Norton et al. | 386/52 |
| 6,208,805 B1 * | 3/2001 | Abecassis | 386/126 |
| 6,347,183 B1 * | 2/2002 | Park | 386/94 |
| 6,600,969 B2 | 7/2003 | Chen et al. | 386/52 |
| 7,200,852 B1 * | 4/2007 | Block | 725/28 |
| 7,266,771 B1 * | 9/2007 | Tow et al. | 715/719 |
| 2002/0110354 A1 | 8/2002 | Ikeda et al. | 386/52 |
| 2002/0154219 A1 * | 10/2002 | Dieterich et al. | 348/180 |
| 2003/0002852 A1 * | 1/2003 | Kobayashi | 386/52 |
| 2003/0031461 A1 * | 2/2003 | Takayama | 386/52 |
| 2003/0133022 A1 | 7/2003 | Melton | 348/231.2 |
| 2004/0055012 A1 * | 3/2004 | Kimball et al. | 725/88 |
| 2004/0143675 A1 * | 7/2004 | Aust | 709/236 |
| 2004/0190472 A1 * | 9/2004 | Dunn et al. | 370/331 |
| 2005/0123192 A1 * | 6/2005 | Hanes et al. | 382/164 |

FOREIGN PATENT DOCUMENTS

WO  WO 01/45391 A1  6/2001
WO  WO 02/052565 A1  7/2002

* cited by examiner

*Primary Examiner* — William C Vaughn, Jr.
*Assistant Examiner* — Oluwaseun A Adegeye
(74) *Attorney, Agent, or Firm* — Thomas, Kayden, Horstemeyer & Risley, LLP

(57) ABSTRACT

A system and method for automated editing of content is disclosed. The system includes a biasable editing engine. A user is provided with content. The user rates the content according to user preferences. The system receives the ratings implements the editor engine, which edits the content and which is biased in its decision making by user ratings.

24 Claims, 4 Drawing Sheets

APPARATUS AND METHOD FOR AUTOMATED VIDEO EDITING …

TECHNICAL FIELD

The present invention is generally related to an apparatus and method for automated video editing and, more particularly, is related to an apparatus and method for user biased automated editing digital video content.

BACKGROUND OF THE INVENTION

As consumer use of digital video on personal computers (PCs) and consumer electronics devices grows, traditional video editing solutions are proving to miss the true needs of the users. A major problem is the complexity of the editing task and the resulting complexity of the user interface required to perform it. This complexity is both a significant barrier to use and prevents editing from being performed in the consumer electronic-style user experience scenario (TV and remote control) that is gaining importance in the PC industry.

Recently a number of products have been introduced that try to reduce the complexity of the editing task, examples include Sony's MovieShaker, Microsoft's MovieMaker 2.0, and Muvee's AutoProducer. All of these products provide some degree of automated editing, where the software analyzes the video and audio content and makes editing decisions based on a set of editing rules.

Current automated editing products typically use editing rules that embody a domain of knowledge that is normally beyond that of even most avid video editing enthusiasts. The editing rules are commonly based on color and motion analysis of the video and pitch and rhythm analysis of the audio.

However, these automated editing engines do not understand the meaning of the video and audio. This lack of understanding can be easily shown by the example of a wedding video. When editing a wedding video, one would not want to eliminate the scene where the bride and groom say 'I do', nor would you want to insert a cut in the audio between the words 'I' and 'do'. Yet this is exactly what the current state of the art might edit because the analysis of the video and audio does not understand the importance of this scene to the viewer.

One approach to solving this problem, as implemented in the MGI Cinemagic and Microsoft MovieMaker software, is to allow the user to post-edit the automated results. This allows the user to correct for these inevitable errors in the automated process. However, this approach is fundamentally flawed because, by performing manual editing as a second step, many of the positive attributes of the automated process (such as synchronization of music and video edits) are lost. In addition, this approach re-introduces conventional video editing into the user experience and interface, eliminating the possibility of a consumer-electronics style solution.

Thus, a heretofore unaddressed need exists in the industry to address the aforementioned deficiencies and inadequacies.

SUMMARY OF THE INVENTION

Embodiments of the present invention provide a system and method for automated editing of content. Briefly described, in architecture, one embodiment of the system, among others, can be implemented as follows. The system includes a mechanism for providing a user with a sequence of frames of content. The system also includes a mechanism for associating a rating with a portion of the sequence of frames. The system also includes a mechanism for editing the sequence of frames according to the rating.

Embodiment of the present invention can also be viewed as providing methods for automated editing of content. In this regard, one embodiment of such a method, among others, the step of providing a user with a sequence of frames of content. The method also includes the step of receiving a rating for a portion of the sequence of frames. Finally, the method also includes the step of biasing an editor of the digital content according to the rating.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
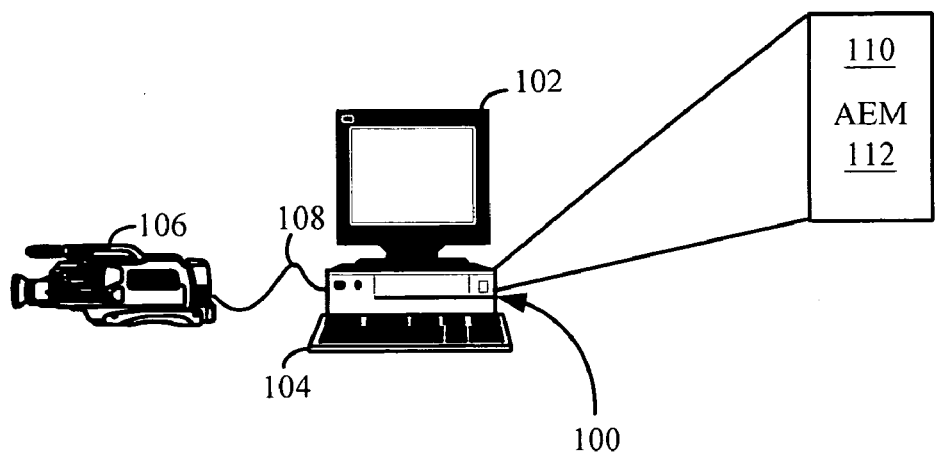
FIG. 1 is a diagram of one embodiment of an automated video editing system.
Figure 2:
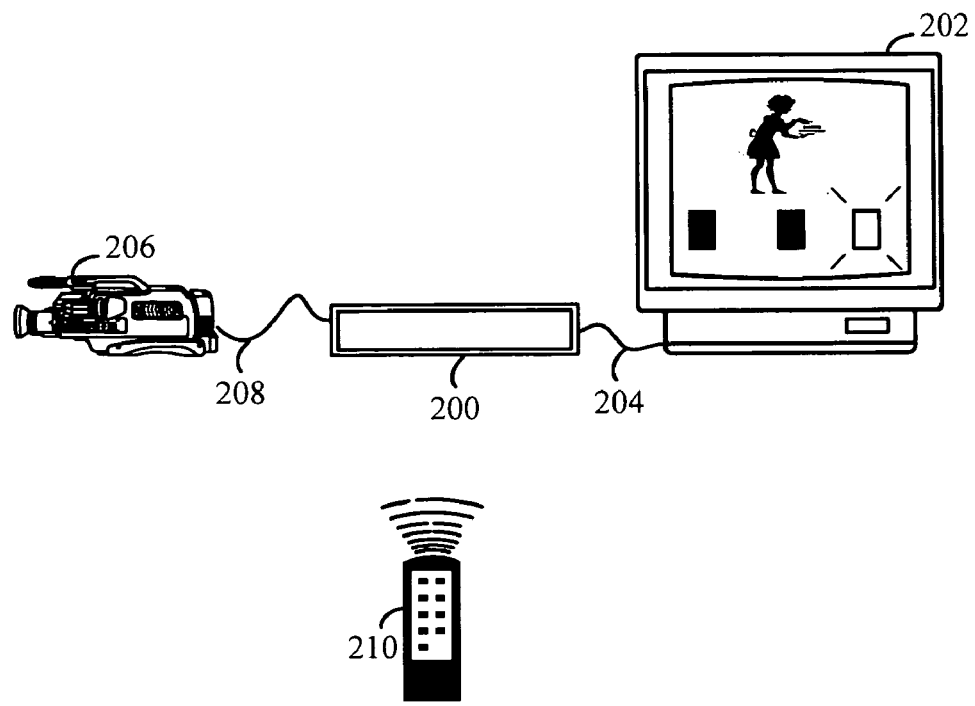
FIG. 2 a diagram of a second embodiment of an automated video editing system.

FIGS. 1 and 2 depict an overview of two embodiments of the proposed automated video editing system. Embodiments of the present invention are described as editing digital content, but it is to be understood that this is done only for the sake of clarity. The scope of the present invention is intended to be format independent and include digital and analog content among others. In accordance with broader aspects of this system, FIG. 1 depicts a first embodiment of an automated video editing system including a computer 100 having a monitor 102 and a keyboard/mouse 104. The computer 100 is typically a standard personal computer, such as a desktop or laptop computer used by many consumers in a home environment.

The computer 100 is coupled to a video camera 106 via an electrical cable 108. Digital content is downloaded from the video camera 106 onto the computer 100. The computer 100 includes a memory 110 and an automatic editor module (AEM) 112 stored therein. A user of the computer 100 uses the AEM 112 to edit video content downloaded to the computer. The user views the digital content being edited on the monitor 102 and provides user input via the keyboard/mouse 104.

FIG. 2 depicts broader aspects of a second embodiment in which a user employs an automatic video editing system. A user downloads content into a video editor 200 from a video camera 206, which is coupled to the video editor 200 by an electrical connector 208. The video editor 200 is coupled to a television 202 via an electrical connector 204. The video editor 200 includes a memory (not shown) having an automatic editor module (not shown) stored therein. Details of the automatic editor module are provided hereinbelow.

In broad terms, a user views digital content on a TV screen or computer screen or other such display device. The user then rates the content while viewing the content. The user may use input devices such as, but not limited to, remote controls, keyboard and/or mouse, or voice input to provide their ratings of the viewed content. The AEM receives the ratings and associates the ratings with specific frames of content. In one embodiment, the AEM associates a rating with the frame that was being displayed when the rating was received. In other embodiments, the AEM associates a rating with a frame other than the frame that was being displayed at the time that the rating was received. The AEM then uses the ratings to biases its editing of the digital content.

The AEM module, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

Figure 3:
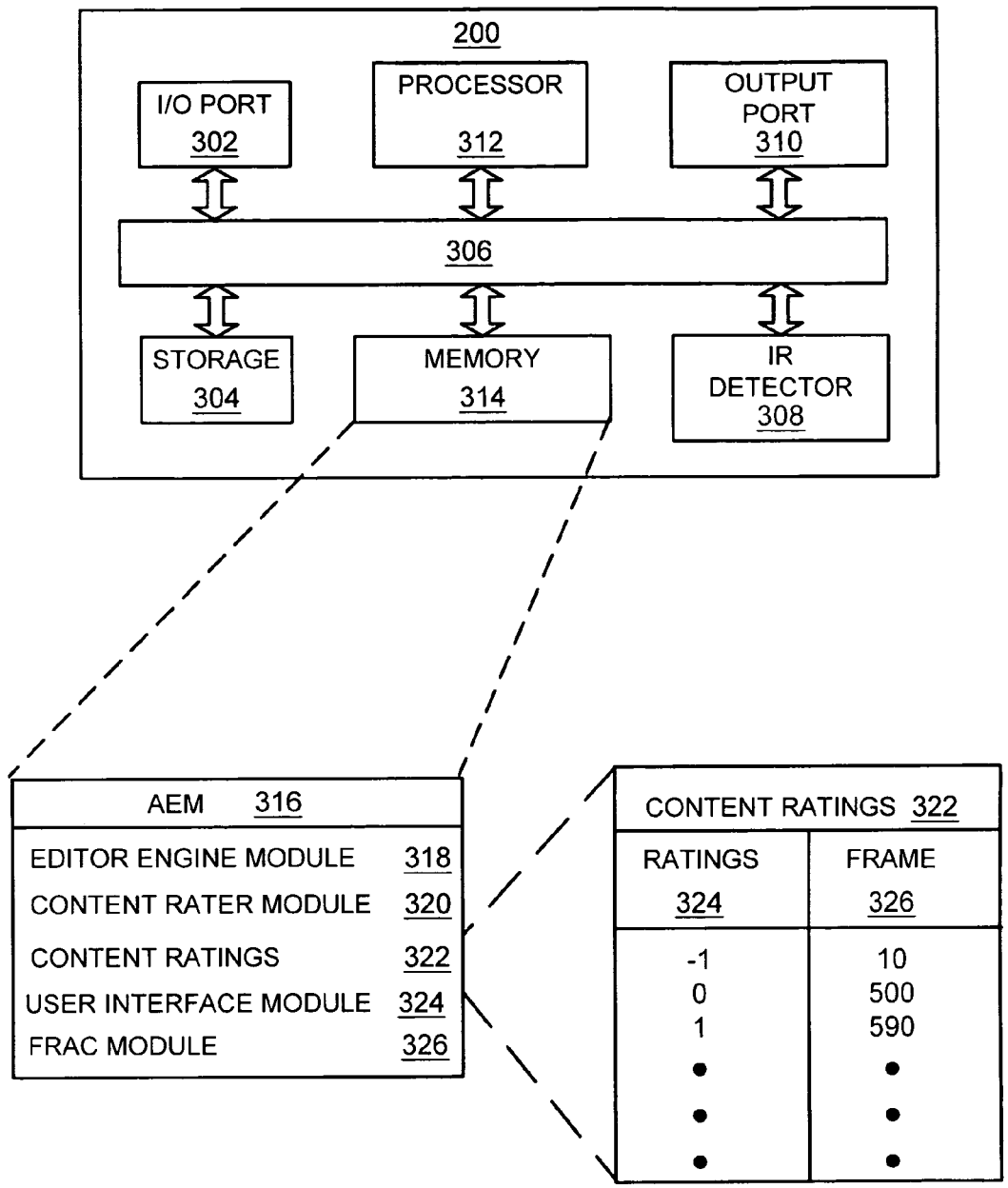
FIG. 3 is a block diagram of an automated video editor.

Referring to FIG. 3, the video editor 200 includes an input/output port 302 and a storage device 304. The input/output port 302 is adapted to couple with the electrical connector 208 so that devices such as the video camera 206 can provide digital content, which is then stored in the storage device 304. The digital content is communicated from the I/O port 302 to the storage device 304 via a bus 306.

The video editor 200 also includes an infrared detector 308 for receiving user input from the remote control 210 and an output port 310. The output port 310 is adapted to couple to the electrical connector 204 so that content can be displayed on a device such as the television 202.

The video editor 200 also includes a processor 312 and a memory 314, which has an AEM 316 stored therein. Among other things, the processor 312 receives user input from the infrared detector 308 and implements the AEM 316 to edit digital content. The AEM 316 also includes an editor engine module 318, a content rater module 320, content ratings 322, user interface module 324, and frame-rating correction (FRAC) module 326, which is described in detail hereinbelow.

The user interface module 324 includes logic for displaying a ratings menu (not shown) to a user and receiving user input, i.e., ratings. Typically, the ratings menu is displayed on the same TV screen or computer screen, etc., as the digital content that is being edited. In one embodiment, the displaying of a ratings menu is optional. In that embodiment, user interface module 324 receives user input without displaying a menu of ratings.

The content rater module 320 includes logic for associating user supplied ratings with a frame of digital content. The content rater module 320 associates a received user rating with at least a specific frame of digital content. In one preferred embodiment, the specific frame of digital content is the frame that is currently being displayed at the time the user provided the rating. However, as will be disclosed in detail hereinbelow, in another embodiment, the FRAC module 326 may associate a rating with a frame that is different from the currently displayed frame. The content rater module 320 generates the content ratings 322 responsive to user input.

The content ratings 322 associate a rating 324 with a frame 326 of digital content. In one embodiment, the content ratings 322 associates every frame of the digital content with a rating. In other words, content ratings 322 includes a rating 324 for every frame 326. Thus, if the digital content were 10,000 frames in length, the content ratings 322 would include ratings 324 for each of the 10,000 frames. The content ratings 322 can be compressed so that the ratings for a sequence N frames, which have the same rating, could be given by three numbers: frame number, number of subsequent frames having the common rating, and rating. For example, for an exemplary sequence of frames in which frames 1-100 have the same rating, eg., "+1" and frames 101-500 have a common different rating, eg., "0", then the ratings for all 500 frames could be written as the following pair of triplet numbers: (1, 100, +1) and (101, 400, 0).

In another embodiment, only specific frames are explicitly associated with a rating. For example, for some arbitrary digital content stored in the storage device 304, the tenth frame of the digital content is rated "−1", the 500$^{th}$ frame is rated "0", and the 590$^{th}$ frame is rated "+1" and so on for the entirety of the digital content. Generally, frames interposing specific frames are implicitly associated with the rating of the preceding specific frame; for example, frames 11-499 would implicitly have the rating of "−1" for the exemplary content ratings 322 illustrated in FIG. 3.

In another embodiment, specific frames, which generally correspond to some sort of transition event in the digital content, are associated with ratings. The AEM 316 determines which subsequent frames are also implicitly associated with the rating. For example, some arbitrary digital content frame 750 might be rated as "+1" and the next rating is associated with frame 1125. The editor engine module 318 analyzes the content subsequent to frame 750 looking for a frame having at least one transition event. Assuming that frame 980 is the first frame subsequent to frame 750 having a transition event, the editor module 318 then determines that all of the frames between frame 750 and frame 980 have the same rating as frame 750. In this embodiment, after the AEM 316 has found a frame that includes a transition event that is not explicitly associated with a user defined rating, the AEM 316 then reverts back to a default state and treats the frame having the transition event and all of the frames between the frame having the transition event and the next frame that is explicitly associated with a user rating in an unbiased manner. Continuing with the example given above, the AEM 316 would treat frames 980 through 1124 in an unbiased manner.

Content having a rating of "−1" falls into a category known as "must delete"; content having a rating of "+1" falls into a category known as "must keep"; and content having a rating of "0" falls into a category known as "neutral" or "unbiased". Although embodiments of the invention are disclosed employing three ratings ("−1"="must delete", "0"="neutral", and "+1"="must keep"), those skilled in the art would recognize that the number of ratings is a matter of implementation. In another embodiment, there are simply two ratings: ("−1" and "+1"). In yet another non-limiting embodiment, the number of ratings is a continuum of numbers extending between a minimum, which represents "must delete", to a maximum, which represents "must keep". The scope of the present invention is intended to cover any number of ratings ranging from a first rating that is associated with at least user-dislike to a second rating that is associated with at least user-acceptance.

The editor engine module 318 is typically an automated digital video editor module that is adapted to edit digital content according to the content ratings 322 in addition to its normal editing rules or styles. The content ratings 322 bias the editor engine module 318 towards user specified goals, such as keeping or deleting given segments.

In one embodiment, the editor engine module 318 is a modified conventional editor module known to those skilled in the art that is modified and enhanced to receive the content ratings 322 such that the editor engine module is biased in its editing decisions by the content ratings 322. A non-limiting example of a conventional editor engine module is the muvee Autoproducer 3 by muvee Technology, which can be reached via the Internet at www.muvee.com.

In one embodiment, the editor engine module 318 includes the logic for finding transition events in the content. Those skilled in the are familiar with editor engines that are adapted to find transition events.

Figure 4A:
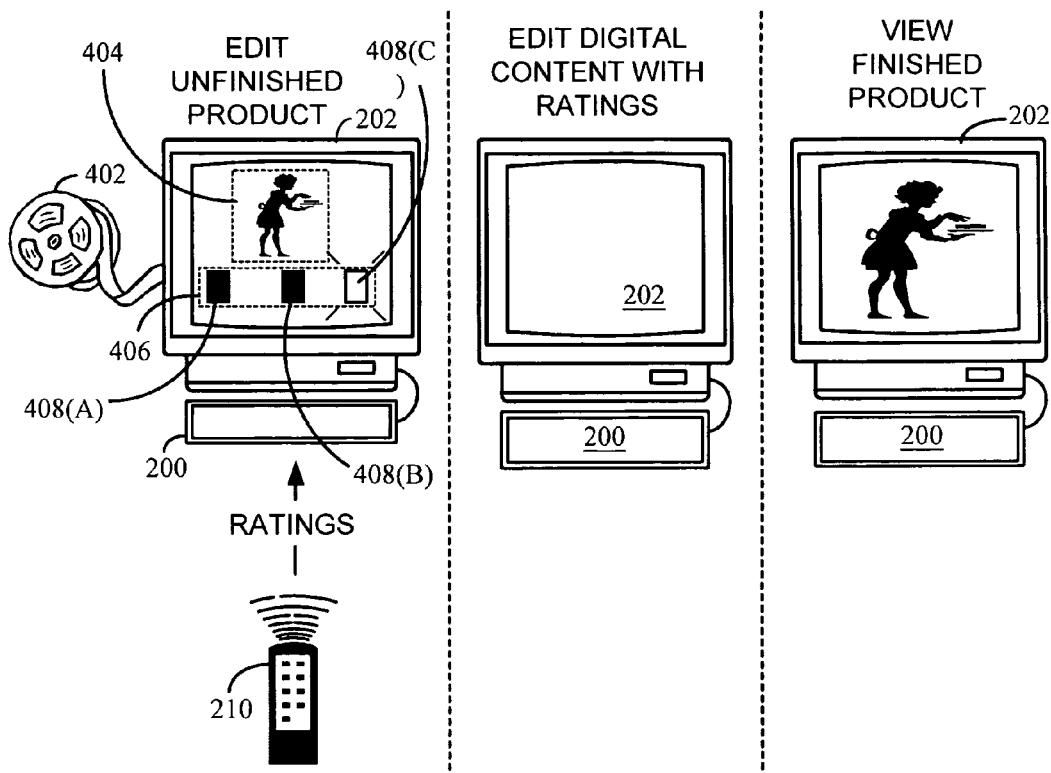
FIG. 4A illustrates steps by a user to edit content.
Figure 4B:
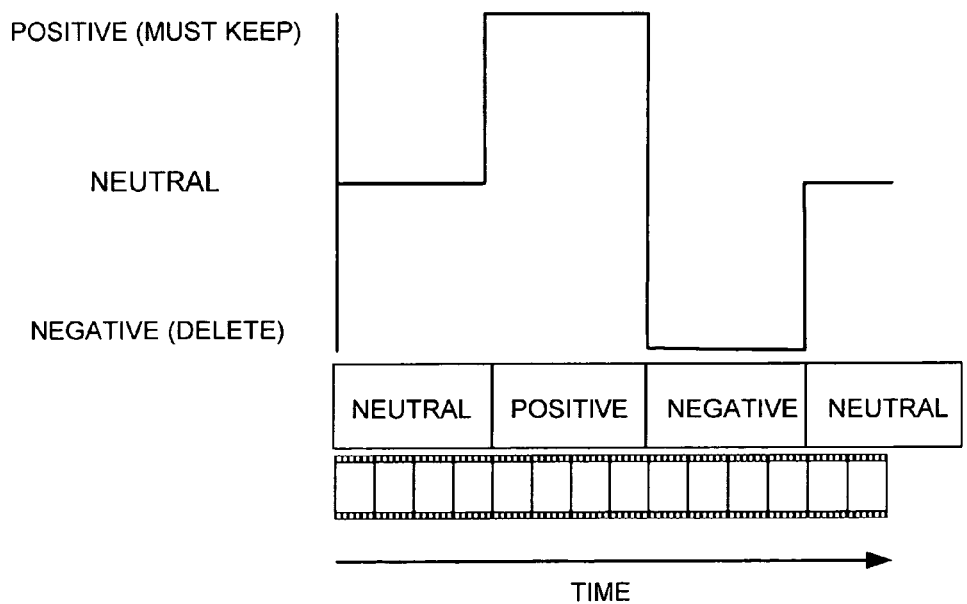
FIG. 4B illustrates the association between user ratings and content.

FIG. 4A and FIG. 4B illustrate the temporal flow of events as a user edits digital content 402 that has been stored in the storage device 304 of the video editor 200. The user initiates the video editor 200 for editing the digital content 402 using the remote control 210. The video editor 200 displays the digital content 402 in an editing window 404 and displays a ratings menu 406 on the TV 202. In this non-limiting embodiment, the ratings menu 406 indicates three categories of ratings each represented by an icon 408. The icons 408(a) and 408(b) are currently inactive and are displayed as dimmed or grayed out. The icon 408(c) is currently active and flashes or is otherwise illuminated to signify that it is active.

As the user watches the digital content 402 in the editing window 404, the user uses the remote control 210 to rate what he is currently seeing. If the user approves of the current content, then the user uses the remote control to select the highest rating for the content. The video editor 200 then associates the user selected rating with the frame currently being shown.

FIG. 4B illustrates that as the user views the content, different segments of content are associated with ratings as supplied by the user. The user-supplied ratings are stored in the content ratings 322.

After the user has finished viewing the digital content, the editor engine module 318 uses the content ratings 322 to edit the digital content 402. The editor engine module 318 is biased by the content ratings 322 towards action such as delete or keep segments of the digital content. The editor engine module 318 performs the editing and saves the edited product on the storage device 304. The user can then view the finished product on the TV 202.

In one embodiment, the AEM 316 includes frame-rating association correction (FRAC) module 326. When the user views digital content and decides that a segment should be rated at a specific level, there is a reaction time delay between when the decision is made and when the user provides the necessary input, e.g., clicks on the mouse, hits the correct key on the keyboard, clicks the correct button on the remote control, etc. When the user prompt is received by the editor 200 or computer 100, the FRAC module 326 determines which frame is currently being displayed and then compensates for the reaction time delay to associate a different frame with the new rating.

In one embodiment, reaction time delays are assumed to be a known constant such as 0.7 seconds. The AEM 316 determines the rate at which frames are being displayed and multiplies the frame rate by the reaction time delay to calculate the number of frames between when the user made the decision and when he entered his decision. Thus, in this embodiment, the FRAC module 326 works whether or not the user is viewing the digital content at a normal speed, or slow motion, fast forward, or any other speed including in rewind mode.

Another source of delay is human processing delay. The user must view the digital content, mentally process the content, and then make decisions about the content: "how much do I like/dislike this scene?"; "do I want to keep/delete this scene?"; "is the scene focused/unfocused?"; etc.

In one preferred embodiment the AEM 316 compensates for human processing delay. In another preferred embodiment, the AEM 320 includes logic for evaluating frames, both audio and video (if contained in the content), and determining therefrom certain events that are called transition events. Non-limiting examples of transition events include time code gap, audio discontinuity, frame-to-frame (FTF) content change, video-only FTF content change, audio-only FTF content change, etc. Table 1 lists non-limiting examples of transition events and weights showing their relative importance (weight) or likelihood of causing a user to associate one of them with a transition point.

TABLE 1

| | Transition Event | Weight |
|---|---|---|
| A | Time Code Gap | 8 |
| B | Audio Discontinuity | 5 |
| C | Frame-To-Frame (FTF) Content Change | 4 |
| D | FTF video-only Content Change | 2 |
| E | FTF audio-only Content Change | 2 |
| F | Variation in Magnitude | 1 |

Figure 5:
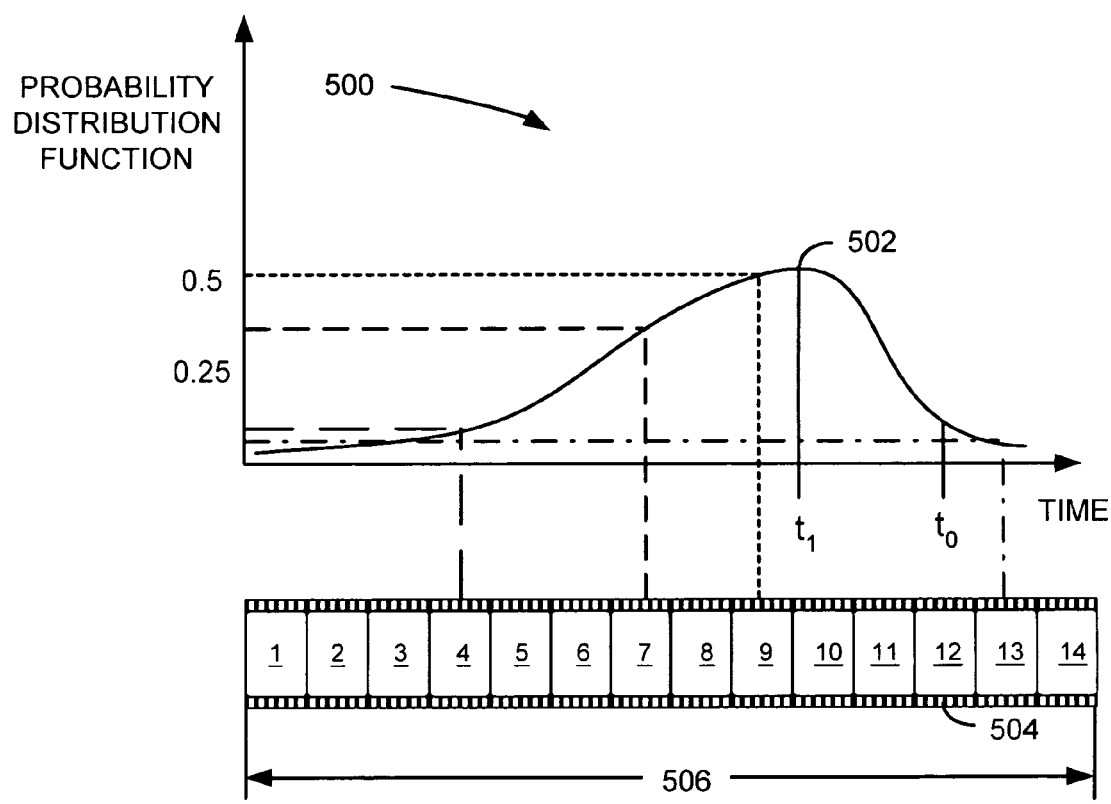
FIG. 5 illustrates determination of the probable frame for associating with a user rating.

An exemplary probability distribution 500 is illustrated in FIG. 5. The probability distribution curve is the probability that shows, for a user entering a new rating for a segment of digital content, the actual stimulus that the user responded to (the desired time), how this time differs from the actual entry time. To clarify, the time $t_0$ corresponds to when the user entered a new rating. The time $t_1$ (in this example) is equal to $t_0$ minus the user reaction time, which is estimated to be approximately 0.7 seconds. While these probability curves may vary from user to user, the probability distribution 500 may commonly exhibit a peak 502 at $t_1$. t1, therefore, is the most-likely location of the actual event that caused the user to enter a new rating value. It should be noted that the probability distribution 500 extends beyond both t and $t_0$ in both directions. Times preceding $t_0$ correspond to an anticipation of the ranking change, which is possible when the user has already seen the content before, and times subsequent to $t_1$ indicate longer processing/decision times than that strictly from user reaction time.

Responding to a user providing a new rating, the FRAC module 326 temporarily associates the current frame 504 with the new rating. The FRAC module 326 then analyzes a segment 506 of the digital content for transition events. For each frame in the segment 506 that includes a transition event, the FRAC module 326 determines when each of the transition events occurred (there can be several in this area), and calculates the weighted probability for each of the frames having a transition event by multiplying the probability at the time of the transition effect by its weighting factor. The frame that includes the transition event having the greatest weighted probability is then determined to be the frame that the user intended to associate with the new rating. For example, consider frames 4, 7, 9, and 13 of segment 504 as each including transition events of type A, B, C, and F, (see Table 1) respectively. In this example, the FRAC module 326 then determines that frame 9 was the frame that the user intended to associate with the new rating because the product of its probability and the weighting for transition event C is greater than all of the products for the other transition events. Consequently, the FRAC module 326 then associates frame 9 with the new rating in the ratings content 322 instead of frame 12. Thus, the content ratings 322 associate ratings 324 with frames 326 having the most probable transition event. In the event that the FRAC module 326 cannot find a transition event in segment 506, the FRAC module 326 may associate either the current frame 504 or the frame at $t_1$ (the point of maximum probability) with the new rating in the content ratings 322.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, embodiments have been described in which the user inputs ratings using devices such as a PC keyboard/mouse and a remote control. However, in another non-limiting embodiment, the user provides user input using an input device such as a thumbwheel to allow rapid up/down input. This type of input device can be used, with or without visual feedback, to provide Ratings of content by the user. All such modifications and variations are intended to be included herein within the scope of this disclosure and the present invention and protected by the following claims.

Therefore, having thus described the invention, at least the following is claimed:

1. A method for editing content, the method comprising the steps of:
   providing, by a computer, a user with a contiguous sequence of frames of content;
   providing a user interface for enabling a user to define a rating of like or dislike for a particular frame, the rating being received when the particular frame is displayed;
   receiving a user-defined rating describing a first portion of the provided contiguous sequence of frames;
   associating the user-defined rating with a first particular frame, wherein the first particular frame is included in the first portion of the provided contiguous sequence of frames;
   analyzing a second portion of frames in the provided contiguous sequence of frames to identify frames having transition events therein;
   determining a second particular frame within the identified frames having transition events therein to be a most probable frame for associating with the user-defined rating input by the user wherein the second frame is determined based on a reaction time delay in receiving the user defined rating; and
   associating the user-defined rating with the second particular frame; and
   biasing an editor of the content according to the user-defined rating to guide editing decisions made by the editor.

2. The method of claim 1, wherein the user-defined rating associated with the particular frame biases the editor to delete the first particular frame from the provided contiguous sequence of frames.

3. The method of claim 1, wherein the user-defined rating associated with the first particular frame biases the editor to prevent the deletion of the first particular frame from the provided contiguous sequence of frames.

4. The method of claim 1, wherein the transition events comprise at least one of:
   gaps in time codes associated with the frames of content;
   discontinuity in audio content;
   frame-to-frame change in video content;
   frame-to-frame change in audio content; and
   variation in magnitude.

5. The method of claim 4, further comprising:
   assigning weight values to the transition events based on relative importance.

6. The method of claim 1, wherein the first particular frame is identified from the first portion of the provided contiguous sequence of frame based on reaction time delay in receiving the user ratings from the user.

7. An apparatus for editing content, the apparatus comprising:
   a memory having an editor engine module stored therein;
   a processor in communication with the memory, the processor adapted to receive a user rating of like or dislike that is associated with a first frame of content in a contiguous sequence of frames of content and execute the editor engine module in conjunction with the rating such that automated editing decisions made by the editor engine module are biased by the rating, the user rating being received when the first frame of content is displayed; and
   a user interface in communication with the processor and adapted to receive user ratings for a particular frame, wherein the processor identifies a second frame in which to associate with the user ratings input by the user, wherein the processor identifies the second frame based on reaction time delay in receiving the user ratings from a user.

8. The apparatus of claim 7, wherein the apparatus is a computer.

9. The apparatus of claim 7, wherein the memory further includes content ratings that associates ratings with frames.

10. The apparatus of claim 7, wherein the portion of frames includes a given frame, the editor engine module is biased by the rating, and responsive to the rating means having a predetermined value, the editor engine module is biased to delete the given frame from the portion of frames.

11. A program for editing content, the program being embodied in a non-transitory computer readable medium, the program comprising:
   logic configured to provide a user with a contiguous sequence of frames of content;

logic configured to receive a rating from a user when a first particular frame is provided, wherein the rating is a user-defined rating describing whether the user likes or dislikes the first particular frame;

logic configured to analyze a portion of the provided contiguous sequence of frames to identify frames having transition events therein;

logic configured to determine a second particular frame within the identified frames having transition events therein that is the most probable frame for associating with the rating;

logic configured to associate the rating with the second particular frame, wherein the second particular frame is different from the first particular frame; and logic configured to bias an editor of the content according to the rating to guide automated editing decisions made by the editor.

12. The program of claim 11, further including:
logic configured to provide a user interface for enabling a user to input ratings.

13. The program of claim 11, wherein a first particular frame is associated with the rating, and the rating biases the editor to delete the first particular frame from the provided contiguous sequence of frames.

14. The program of claim 11, wherein a first particular frame is associated with the rating, and the rating biases the editor to prevent the deletion of the first particular frame from the provided contiguous sequence of frames.

15. The program of claim 11, wherein the transition events comprise at least one of:
frame-to-frame change in video content;
frame-to-frame change in audio content; and
gaps in time codes associated with the frames of content.

16. The program of claim 15, wherein logic configured to analyze a portion of the sequence of frames is further configured to assign weight values to the transition events based on relative importance.

17. A method for editing content, the method comprising the steps of:
receiving, at a computer, a contiguous sequence of frames of content;
receiving a rating entered by a user for a particular frame within the contiguous sequence of frames, wherein the rating is user-defined, the rating indicates whether the user likes or dislikes the particular frame, and the rating is received when the particular frame is displayed;
compensating for reaction time delay associated with entering the rating by the user and associating the rating with a different frame based on a reaction time delay; and
biasing an editor of the content according to the rating to guide automated editing decisions made by the editor.

18. The method of claim 17, further including the step of:
displaying to the user the contiguous sequence of frames.

19. The method of claim 17, wherein the editor is responsive to the rating having a predetermined value, the editor biased to delete the particular frame.

20. The method of claim 19, wherein the editor is responsive to the rating having a second predetermined value, the editor biased to prevent the deletion of the particular frame.

21. A method for editing content, the method comprising the steps of:
providing a user, by a computer, with a contiguous sequence of frames of content;
providing a user interface for enabling a user to input a user-defined rating of like or dislike for a first portion of the provided contiguous sequence of frames;
receiving the user-defined rating when the first portion of the provided contiguous sequence of frames is displayed;
associating the user-defined rating with a first particular frame, wherein the first particular frame is included in the first portion of the provided contiguous sequence of frames that is a most probable frame for associating with the rating;
biasing an editor of the content according to the user-defined rating to guide editing decisions made by the editor.

22. The method of claim 21, further comprising the steps of:
analyzing a second portion of frames in the provided contiguous sequence of frames to identify frames having transition events therein;
determining a second particular frame within the identified frames having transition events therein to be a most probable frame for associating with the user-defined rating input by the user; and
associating the user-defined rating with the second particular frame.

23. The method of claim 21, wherein the user-defined rating associated with the first particular frame biases the editor to delete the first particular frame from the provided contiguous sequence of frames.

24. The method of claim 21, wherein the user-defined rating associated with the first particular frame biases the editor to prevent the deletion of the first particular frame from the provided contiguous sequence of frames.

* * * * *

UNITED STATES PATENT AND TRADEMARK OFFICE
CERTIFICATE OF CORRECTION

| | |
|---|---|
| PATENT NO. | : 8,290,334 B2 |
| APPLICATION NO. | : 10/755122 |
| DATED | : October 16, 2012 |
| INVENTOR(S) | : Demeyer |

It is certified that error appears in the above-identified patent and that said Letters Patent is hereby corrected as shown below:

Column 7, Line 64, please insert --, wherein the first particular frame is determined based on a reaction time delay in receiving the user defined rating-- after "frames"

Column 8, Lines 4-6, please delete ", wherein the second frame is determined based on a reaction time delay in receiving the user defined rating."

Signed and Sealed this
Fourth Day of December, 2012

David J. Kappos
*Director of the United States Patent and Trademark Office*